No. 619,694. Patented Feb. 14, 1899.
J. J. POWER.
APPARATUS FOR FORMING GLASS ARTICLES.
(Application filed Apr. 2, 1897.)
(No Model.) 5 Sheets—Sheet 1.

Witnesses:
J. B. Switzer
W. A. Blakley

Inventor
John J. Power
By J. N. Cooke
Attorney

No. 619,694.  
J. J. POWER.  
APPARATUS FOR FORMING GLASS ARTICLES.  
(Application filed Apr. 2, 1897.)  
(No Model.)  
Patented Feb. 14, 1899.  
5 Sheets—Sheet 3.

Witnesses:
J. B. Sweitzer
W. H. Blakeney

Inventor
John J. Power
By J. N. Cooke
Attorney

No. 619,694. Patented Feb. 14, 1899.
J. J. POWER.
APPARATUS FOR FORMING GLASS ARTICLES.
(Application filed Apr. 2, 1897.)
(No Model.) 5 Sheets—Sheet 4.
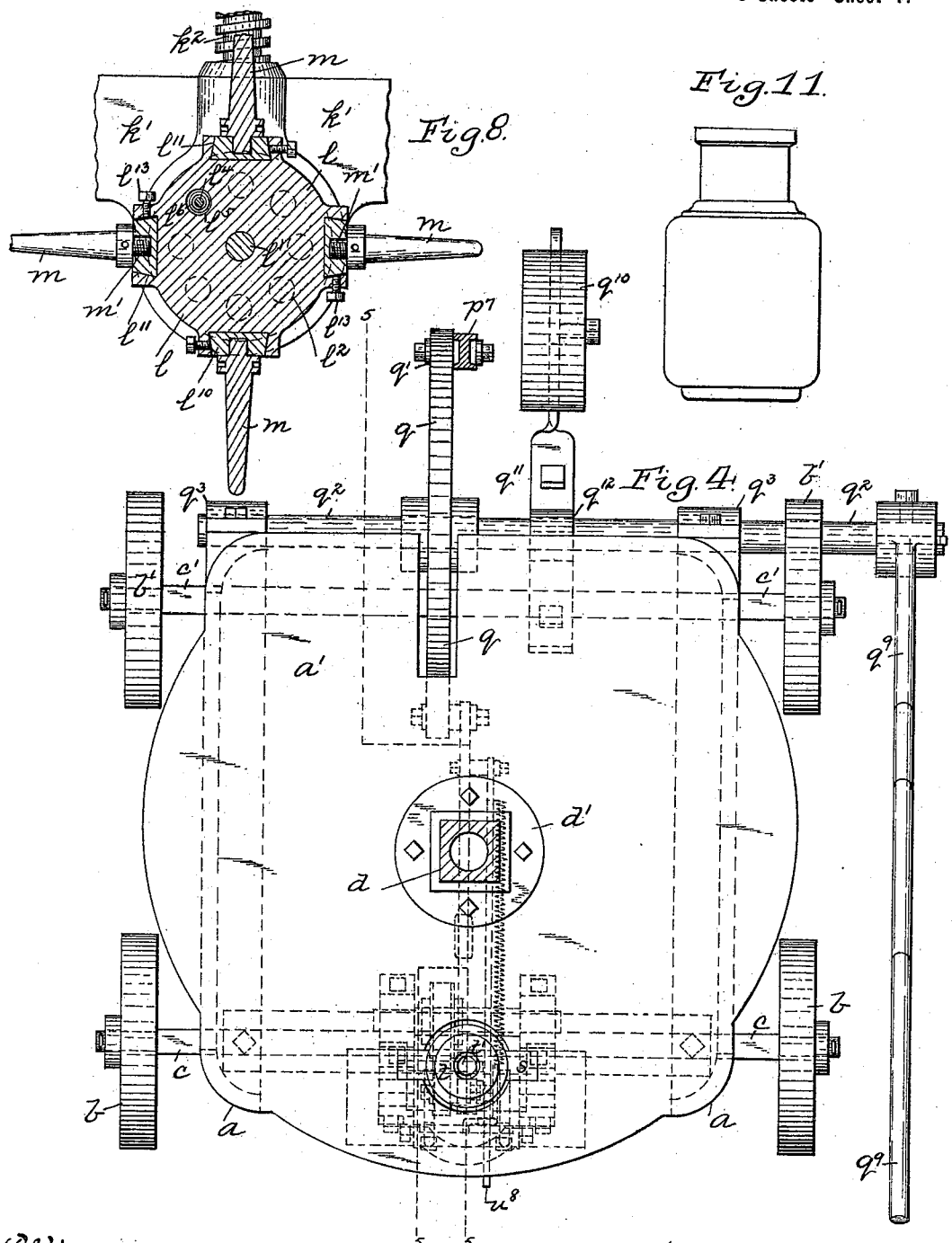
Witnesses:
J. B. Sweitzer
W. H. Blakeley
Inventor,
John J. Power
By J. N. Cooke
Attorney.

No. 619,694. Patented Feb. 14, 1899.
J. J. POWER.
APPARATUS FORMING GLASS ARTICLES.
(Application filed Apr. 2, 1897.)
(No Model.) 5 Sheets—Sheet 5.
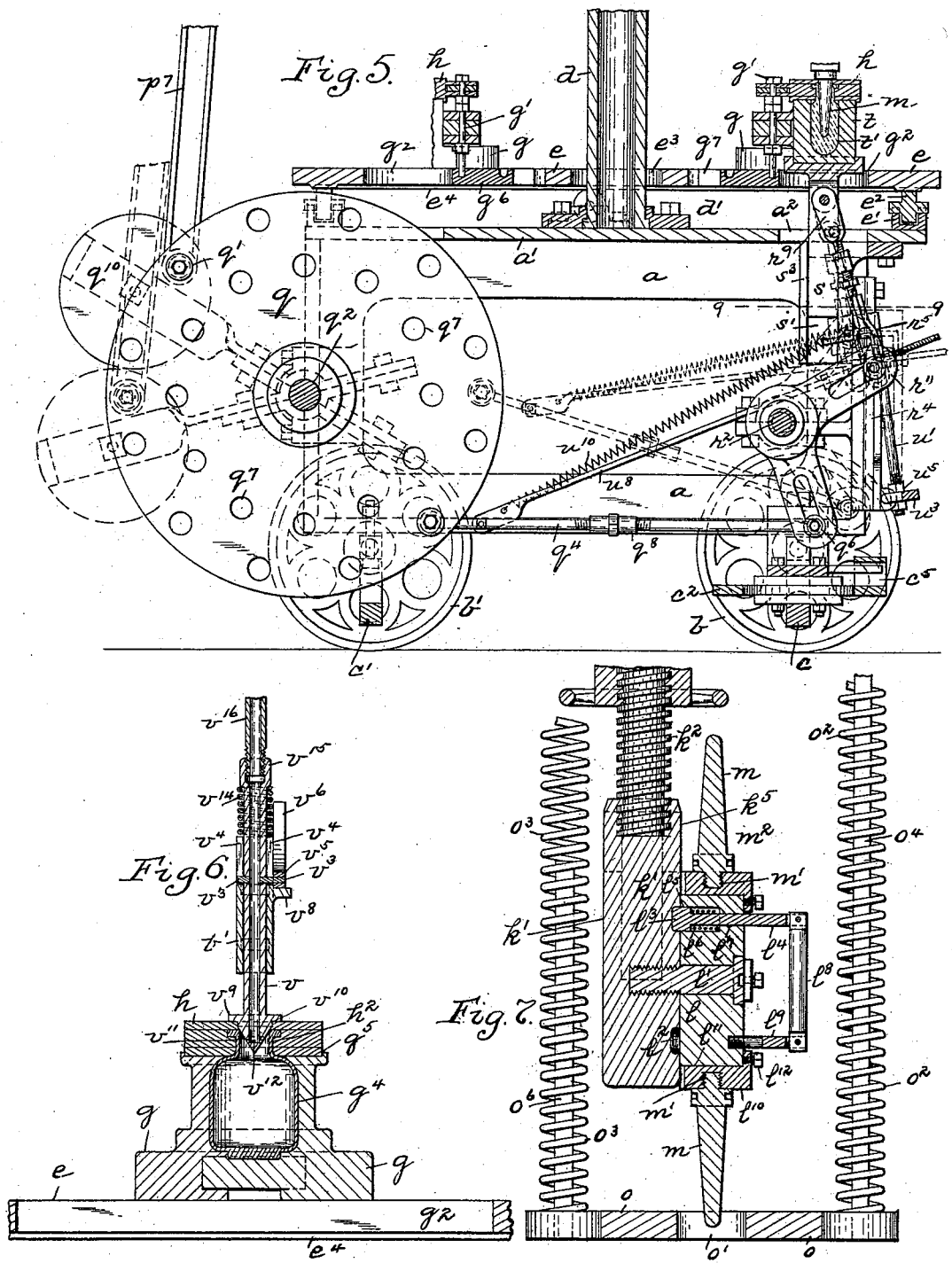

UNITED STATES PATENT OFFICE.

JOHN J. POWER, OF PITTSBURG, PENNSYLVANIA, ASSIGNOR OF ONE-HALF TO THE SIMONDS MANUFACTURING COMPANY, OF SAME PLACE.

APPARATUS FOR FORMING GLASS ARTICLES.

SPECIFICATION forming part of Letters Patent No. 619,694, dated February 14, 1899.

Application filed April 2, 1897. Serial No. 630,437. (No model.)

*To all whom it may concern:*

Be it known that I, JOHN J. POWER, a citizen of the United States, residing at Pittsburg, in the county of Allegheny and State of Pennsylvania, have invented certain new and useful Improvements in Apparatus for Forming Glass Articles; and I do hereby declare the following to be a full, clear, and exact description thereof.

My invention relates to apparatus for forming glass articles, such as bottles, &c.; and it has for its object to provide a simple form of apparatus for the manufacture of such articles by which the work can be carried on accurately and expeditiously at one operation without the handling of the article until it is finished.

My invention consists, generally stated, in the novel arrangement, construction, and combination of parts, as hereinafter specifically set forth and described, and particularly pointed out in the claims.

To enable others skilled in the art to which my invention appertains to construct and use the apparatus, I will describe the same more fully, referring to the accompanying drawings, in which—

Figure 1:
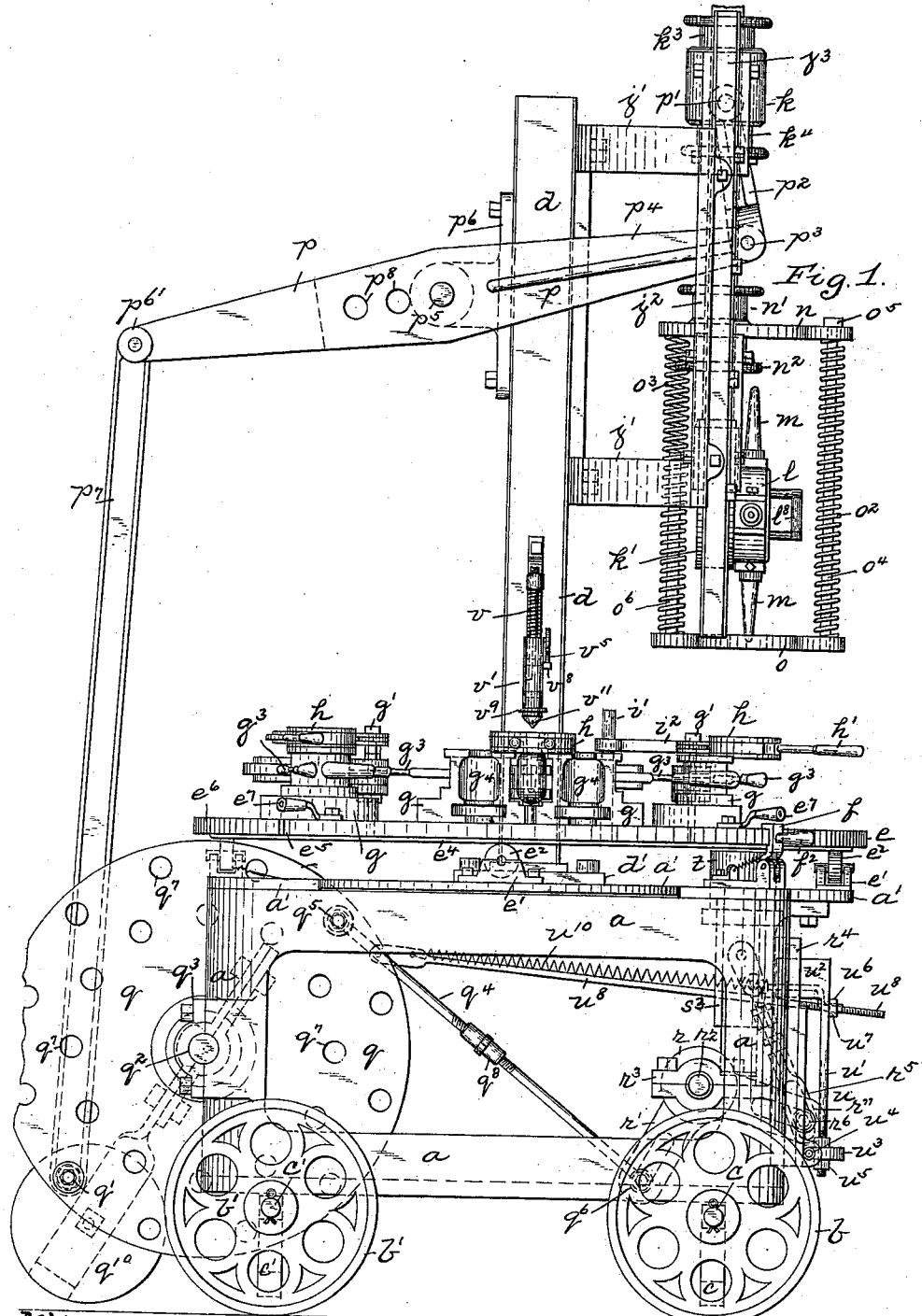
Figure 2:
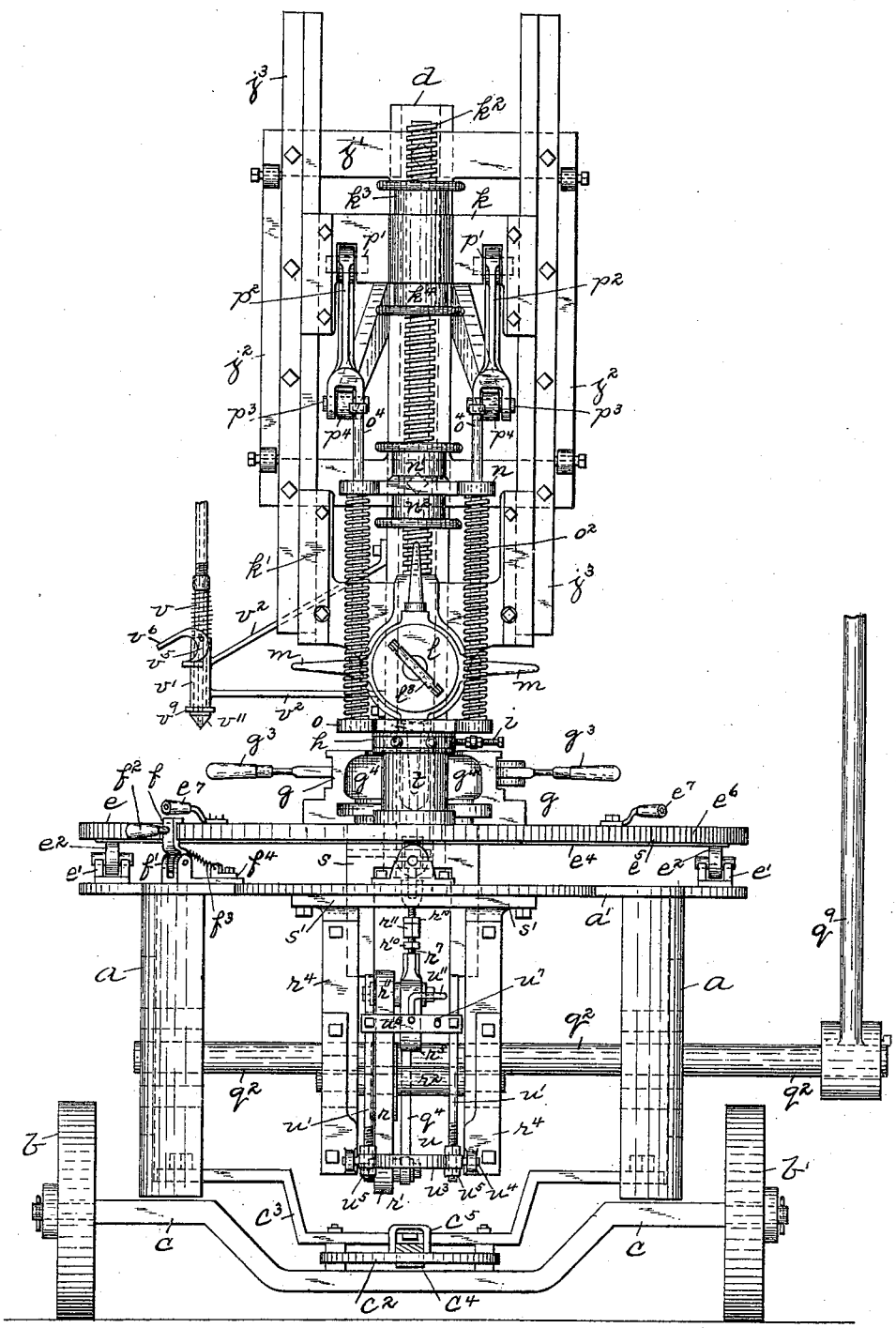
Figure 3:
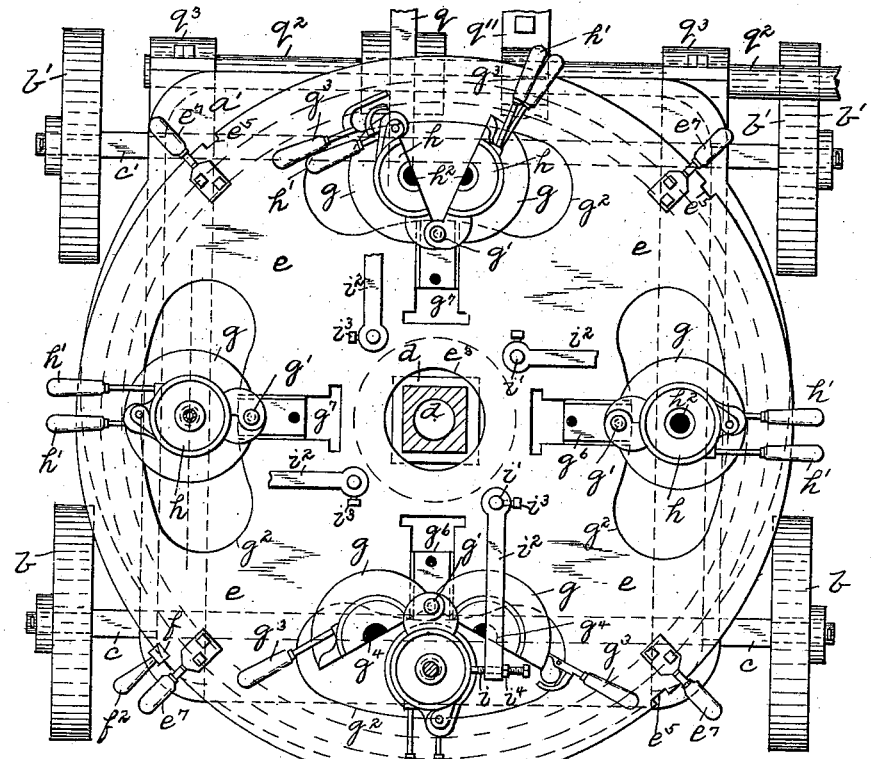
Figure 9:
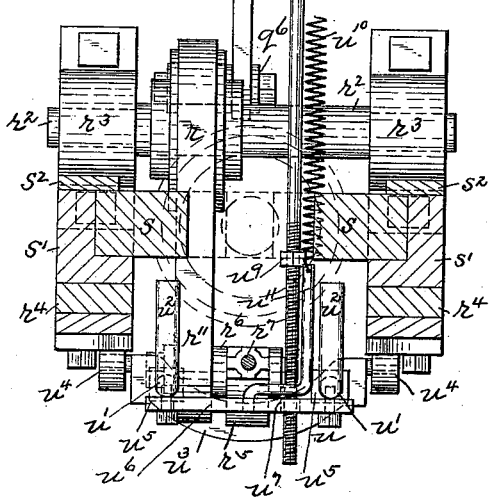
Figure 10:
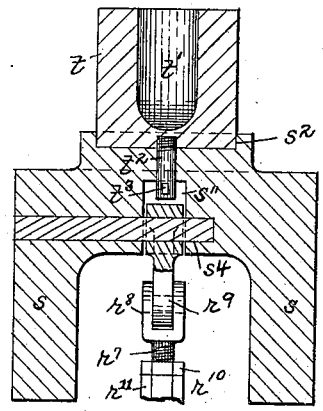

Figure 1 is a side view of the invention, showing the parts in their normal positions with the main mold lowered and the plunger raised, the parison and neck-mold being under the blowpipe, which is ready to be lowered to blow the bottle into finished shape in the body-mold below the same. Fig. 2 is a front view of the apparatus, showing the press-mold in its raised position with the neck-mold resting on top of the same and the plunger lowered therein to form and finish the neck of the bottle. Fig. 3 is a top view of the rotary table, showing the standard in section and the molds in their different positions thereon. Fig. 4 is a top view of the frame or base with the rotary table removed. Fig. 5 is a cross-section on the line 5 5, Fig. 4, showing the parts for raising and lowering the plunger and press-mold in another position. Fig. 6 is an enlarged detail cross-section of the body and neck molds and the blowing device in position for blowing the article to finished shape. Figs. 7 and 8 are enlarged detail sections of the rotatable plunger-disk. Fig. 9 is an enlarged detail view on the line 9 9, Fig. 5, showing the device for raising and lowering the press-mold. Fig. 10 is a detail view of the slide and press-mold, and Fig. 11 is an enlarged sectional view of the finished bottle.

Like letters herein indicate like parts in each of the figures of the drawings.

My improved apparatus for making glass bottles is provided with the main frame $a$, which is preferably supported on the wheels $b\ b'$, mounted on the front and rear axles $c\ c'$, the front axle $c$ being adapted to turn on the fifth-wheel $c^2$, secured in the frame $c^3$ on the main frame $a$, so as to permit the apparatus to be moved to any part of the works in which it is used by means of a tongue $c^4$, engaging with the fifth-wheel $c^2$ through the loop $c^5$ secured thereon. The main frame $a$ is provided with the top plate $a'$, on which is mounted the upright standard $d$, which is secured to the top plate $a$ by means of the pillow-block $d'$ thereon. Journaled in bearings $e'$, secured to the top plate $a'$, are the wheels or rollers $e^2$ for supporting the rotary table $e$, which is provided with an opening $e^3$ therein for fitting loosely around the standard $d$ to permit the rotation of the same, the rollers $e^2$ traveling on a track $e^4$ on the bottom of the rotary table $e$, so as to enable the easy movement of the same. Pivoted within a bearing $f'$, secured on the top plate $a'$, is the spring-catch $f$, having the handle $f^2$, which is adapted to engage with any one of a series of seats $e^5$, formed around the outer edge $e^6$ of the rotary table $e$ to lock the table in any position desired. A spiral spring $f^3$ connects with the catch $f$ and to a sliding plate $f^4$, which is adapted to move within the bearing $f'$ to permit the adjustment of and hold the catch $f$ in contact with the rotary table $e$ when locked, and a number of handles $e^7$ are secured to the top surface of the rotary table $e$ to enable the operators to grasp the same to move the table. Mounted on the top of the rotary table $e$ are the body-molds $g$, which are preferably four in number and formed in sections hinged around posts $g'$, secured in the table $e$, in order that they may be hung together and adapted to be thrown apart. The body-molds $g$ are adapted to fit over the openings $g^2$, formed in the table $e$ and are provided with the handles $g^3$ thereon for opening and closing the same, and in each section of the molds $g$ are formed the cavities $g^4$, corresponding to the finished shape of the body portion of the bottle to be formed. The molds $g$ (illustrated in the drawings) are adapted to make what is known as a "common stock" mustard bottle, although any particular kind of a bottle can be made by the apparatus by simply changing the molds. Hinged around the posts $g'$ are the neck-molds $h$, which are formed in sections, so as to be hung together and be adapted to be drawn apart by means of the handles $h'$, secured thereon. Each section of the neck-molds $h$ is provided with the cavities $h^2$ for forming the finished neck of the bottle and is adapted to fit closely down on top of the body-molds $g$ by means of the seats $g^5$ on top of the molds $g$ fitting around the neck-molds. The posts $g'$ are preferably secured in slides $g^6$, mounted in slots $g^7$ in the rotary table $e$, so as to enable different sizes and shapes of molds to be used. Secured within the rotary table $e$ are the posts $i'$, around which are mounted the bars $i^2$, which are raised and lowered on the posts $i'$ by means of the set-screws $i^3$ engaging therewith, and in the opposite ends of the bars $i^2$ are the adjusting-screws $i$, held by jam-nuts $i^4$ for engaging with the neck-molds $h$ to act as a stop to center the molds $g$ and $h$ during the movement of the same.

Secured to the standard $d$, at or near its upper end, are the brackets $j'$, which are provided with the guides $j^2$ thereon, having the slides $j$ secured thereto, within which move or slide the upper and lower cross-heads $k$ $k'$, connected together by the screw-bar $k^2$, which travels or screws through the upper cross-head $k$ and is rigidly secured to the lower cross-head $k'$. Engaging with the screw-bar $k^2$, above and below the upper cross-head $k$, are the jam-nuts $k^3$ $k^4$ to permit the raising and lowering of the upper cross-head when desired.

Mounted upon the screw-bolt $l'$ on the lower cross-head $k'$ is the rotatable disk $l$, which is provided with a series of tapered plungers $m$, engaging with the disk $l$ by the screw-plugs $m'$ thereon and each of the plungers $m$ having a collar $m^2$ at or adjacent to the rotary disk $l$. A number of seats $l^2$ are formed on the outer face $k^5$ of the lower cross-head $k'$, with which a head $l^3$ on the end of a forked bar $l^4$, passing through an opening $l^5$ in the disk, engages. A spiral spring $l^6$ fits around the forked bar $l^4$ in the opening $l^5$, against the head $l^3$ on the forked bar $l^4$, and the contracted portion $l^7$ of the opening $l^5$ engages with the bar $l^4$. The forked bar $l^4$ is pivoted to the handle $l^8$ at its outer end, and the handle $l^8$ is pivoted at its opposite end to the post $l^9$, secured to the disk $l$. In order to center the plungers $m$ properly, they are preferably screwed, by means of their screw-plugs $m'$, into slides $l^{10}$, having tapered faces thereon engaging with the seats $l^{11}$, provided with tapered faces in the disk $l$, and set-screws $l^{12}$ are adapted to engage with the front face of the disk $l$. Set-screws $l^{13}$ also engage with the sides of the slides $l^{10}$ through the seats $l^{11}$ to further assist in centering the plungers $m$ to place.

Fitting loosely around the screw-bar $k^2$ is the upper spring-plate $n$, which is held in place by means of the jam-nuts $n'$ $n^2$, engaging with the screw-bar $k^2$, above and below the upper spring-plate $n$. Below the upper spring-plate $n$ is the lower spring-plate $o$, having the opening $o'$ therein for the passage of the tapered plungers $m$ through the same and which is connected to the upper spring-plate $n$ by the front and rear spiral springs $o^2$ $o^3$ on each side of the lower cross-head $k'$ and tapered plungers $m$ and between the upper and lower spring-plates $n$ $o$. Bolts $o^4$ are secured in the lower spring-plate $o$, within the front spiral springs $o^2$, which extend through the upper spring-plate $n$ and are provided with the heads $o^5$ at their upper ends, and studs $o^6$ are secured in the lower spring-plate $o$ and extend up a short distance within the rear spiral springs $o^3$.

Pivoted within the upper cross-head $k$ at $p'$ are the links $p^2$, which are pivoted at the lower ends $p^3$ to the forked ends $p^4$ of the forked lever $p$, which is pivoted or fulcrumed at $p^5$ in the bearing $p^6$, secured to the upright standard $d$, and the opposite end of forked lever $p$ being pivoted at $p^{6'}$ to the connecting-rod $p^7$, the said lever $p$ having a number of openings $p^8$ therein for engaging with the pivot $p^5$ in the bearing $p^6$ to regulate the amount of throw or travel of the plungers $m$ and their connecting parts through the medium of the lever $p$. The connecting-rod $p^7$ extends down and is pivoted at $q'$ to a disk $q$, which is mounted on the main shaft $q^2$, secured in bearings $q^3$ on the rear of the main frame $a$. A rod $q^4$ is pivoted to the disk $q$ at $q^5$, the opposite end of which is pivoted at $q^6$ to the slotted arm $r'$ of the bell-crank lever $r$, which is mounted on a shaft $r^2$, secured in bearings $r^3$ on the downwardly-projecting standards $r^4$. A number of openings $q^7$ can be formed in the disk $q$ at irregular points to secure the pivots $q'$ and $q^5$ on the rods $p^7$ and $q^4$ at any point desired to regulate the movement of the rods $p^7$ and $q^4$ and the parts connected thereto and operated therefrom, and the rod $q^4$ is provided with the adjusting-nut $q^8$, engaging with right and left hand screw-threads thereon to vary the length of the same. The main shaft $q^2$ is provided with the operating-lever $q^9$ at one end thereof for moving the disk $q$ to operate the machine and the weight $q^{10}$, secured on the bar $q^{11}$, which is journaled on the shaft $q^2$ by the bearing $q^{12}$. The other slotted arm $r^4$ of the bell-crank lever $r$ is connected to a slotted link $r^5$ by means of the pivot $r^6$, and the link $r^5$ has a forked rod $r^7$ rigidly secured in its upper end and is pivoted at $r^8$ through its forked end to a link $r^9$, pivoted at $s^4$ in the opening $s''$ of the slide $s$, which is adapted to move through an opening $a^2$ in the top plate $a'$ and the openings $g^2$ in the rotary table $e$ and is provided with the bottom or press mold $t$ on its upper end, which is removably secured thereto by means of a screw-plug $t^2$, inserted through the opening $s''$ in the slide $s$ and screwing into the bottom of the press-mold, having a key-seat in its opposite end, with which a key $t^3$ engages to hold the press-mold in place in its seat $s^2$ in the top of the slide $s$, said mold being provided with the cavity $t'$ in the center thereof. The adjustment of the length of the rod $r^7$ can be regulated by the jam-nuts $r^{10}$, engaging with right and left hand threads on the rod $r^7$ on each side of a right and left hand nut $r^{11}$ on said rod $r^7$. The slide $s$ moves in the guides $s'$, secured to the under surface of the top plate $a'$, to which guides $s'$ are secured the downwardly-projecting standards $r^4$, and strips $s^3$ hold the slide $s$ within the guides $s'$. Hinged to the standards $r^4$ is the rocking frame $u$, which is provided with the upright bars $u'$, having heads $u^2$ thereon for engaging with the bottom faces of the slide $s$ and which are secured in the tilting bar $u^3$, pivoted at $u^4$ to the standards $r^4$ by means of the jam-nuts $u^5$. Extending across and secured to the upright bars $u'$ is the cross-brace $u^6$, which is provided with the opening $u^7$ therein for the passage of a rod $u^8$, which is pivoted to the rod $q^4$ and is provided with a nut $u^9$ thereon in the rear of the cross-brace $u^6$. A spiral spring $u^{10}$ connects with the rod $u^8$ and with a rod $u^{11}$, secured in the cross-brace $u^6$.

Secured to the standard $d$ by braces $v^2$ is the cylinder $v'$, within which moves the air-pipe $v$, having the pins $v^3$ thereon moving in slots $v^4$ in the sides of the cylinder $v'$, one of said pins $v^3$ being secured to a cam $v^5$, having a handle $v^6$ thereon for raising and lowering the air-pipe $v$, and the outer face $v^7$ of the cam engages with a lug $v^8$ on the outer surface of the cylinder $v$ during such movement. A flange $v^9$ is formed on the lower end of the air-pipe $v$, which is adapted to engage with the top of the neck-molds $h$ when the air-pipe is in its lowest position, and below the flange $v^9$ is the straight face or head $v^{10}$, which rests in the cavities $h^2$ of the neck-molds $h$ and which terminates in a tapered point $v^{11}$ below the same, having a series of openings $v^{12}$ therein, communicating with the interior of the air-pipe for the escape of the air when blowing the bottle to finished shape within the body-mold $g$. A spiral spring $v^{14}$ is secured around the air-pipe $v$, between the top of the cylinder $v'$ and a collar $v^{15}$ thereon, to hold the pipe $v$ in its raised position after the cam $v^5$ is released, a flexible air-supply $v^{16}$ being attached to said collar. When the pipe $v$ is lowered by the cam $v^5$, the spring $v^{14}$ acts to hold the pipe down so as to form a tight connection between the pipe and the neck-mold $h$ and prevent the air-pressure from forcing the pipe $v$ upwardly.

The operation of my improvement is as follows: The parts of the apparatus being in their normal position, as shown in Fig. 1, and everything ready to begin operation, with the press-mold $t$ in its lowest position beneath the rotary table $e$, below one of the body-molds $g$, which is in its open position, and the neck-mold $h$ above the body-mold being closed so as to receive the press-mold when the latter is elevated, the gatherer gathers a sufficient quantity of hot glass on a punty or gathering-iron from the furnace or pot, which is situate in close proximity to the machine, and drops it into the cavity $t'$ of the press-mold $t$. Then the operator pulls on the operating-lever $q^9$, moving the main shaft $q^2$, and with it the disk $q$, which by its movement forces the connecting-rod $p^7$ and the rear end of the forked lever $p$ upwardly and the forked ends $p^4$ of the lever $p$ downwardly, so lowering the cross-heads $k\ k'$ and allowing the lower spring-plate $o$ to come in contact with the top of the neck-mold $h$. The disk $q$ by the same movement turns the bell-crank lever $r$ on the shaft $r^2$ through the medium of the rod $r^4$, connected to one arm $r'$ thereof, the other arm $r''$ of the lever $r$ being connected by the slotted link $r^5$ to the rod $r^7$, pivoted by means of a link $r'$ to the slide $s$, upon which the press-mold rests and is secured. This movement raises the press-mold $t$, containing the plastic glass, under and against the neck-mold $h$. The slotted arm $r''$ of the bell-crank lever $r$, with which the link $r^5$, with its rod $r^7$, is connected, permits the link and rod to move backward within the arm $r''$ without exerting any pressure on the press-mold $t$ after it has been brought into place against the neck-mold, which construction permits of the plunger $m$ being lowered farther by the continued movement of the operating-lever $q^9$, so as to enter through the neck-mold into the press-mold to perform the pressing. During the raising of the press-mold $t$ the spring $u^{10}$ exercises its tension upon the rocking frame $u$, drawing it against the slide $s$ and forcing the upright bars $u'$ when the press-mold is in its elevated position under the slide, so as to hold the press-mold in such raised position during the pressing operation and while the plunger $m$ is being lowered in the press-mold by the continued movement of the operating-lever $q^9$ and the lower spring-plate $o$ is resting on top of the neck-mold $h$, the springs $o^2\ o^3$ being compressed, permitting the bolts $o^4$ in the springs $o^2$ to rise above the upper spring-plate $n$ and the studs $o^6$ to travel within the springs $o^3$. During this pressing operation the plunger $m$ will enter the molten glass within the press-mold $t$ and force the molten glass up within the cavity $h'$ of the neck-mold $h$, so forming the neck and rim of the bottle and the parison thereof below the same in the cavity $t'$ of the press-mold, after which the lever $q^9$ can be pushed back or returned to its normal or first position, and by this return movement the disk $q$ forces forward the rod $u^8$ and the adjustable nut $u^9$ thereon, which presses against the cross-brace $u^6$ and forces the upright bars $u'$ from under the slides $s$, thus permitting a complete return of all the parts to normal position and leaving a perfectly finished neck and rim and bulb or parison of glass suspended from the neck-mold $h$. The spring-catch $f$ can then be drawn out of its seat $e^5$ in the table $e$ and the table rotated by a boy by means of the handles $e^7$ until it is caught by the catch $f$ being drawn or dropped into the next seat $e^5$ by the spring $f^3$ attached thereto. This rotation of the table $e$ brings the neck-mold $h$, with its suspended parison and body-mold $g$, under the air-pipe $v$ and another neck-mold $h$ and body-mold $g$ into position above the press-mold $t$ for another operation. The boy immediately closes the body-mold $g$ around the suspended glass parison and draws down the air-pipe $v$ by means of the cam $v^5$, thereby bringing the flange $v^9$ down on the neck-mold $h$ and the tightly-fitting head $v^{10}$ down into the top of the neck-mold $h$ and bottle-neck of the parison, with the tapered point $v^{11}$ below the same, when the air can be admitted within the air-pipe $v$ and passing out of the openings $v^{12}$ in the tapered point $v^{11}$ thereof will form the body of the bottle. In the meantime another parison has been made or pressed, and the boy, having raised the air-pipe $v$ by the cam $v^5$ from the neck-mold $h$ and body-mold $g$, rotates the table $e$, bringing the perfected bottle to a position where it is allowed to remain in the closed mold for the purpose of cooling. At the next operation the boy opens the molds and takes the bottle therefrom and arranges the molds preparatory to rotating them into position over the press-mold $t$ for another operation.

If desired, narrow-neck bottles may be made by this apparatus, as the press-mold will afford convenient space or width to deposit the glass which could not be deposited into the space of narrow-neck width.

The rapidity with which the glass is separated from its contact with the press-mold leaves the glass so hot that it is necessary on wares of medium sizes and upward that the operator close the body-mold immediately around it. Otherwise the glass will have become so distended that the body-mold cannot be closed around it, and for the same reason the air must be applied immediately when the blowing position has been reached, thus making the process exceedingly rapid. It is apparent that small bottles can be made by placing a number of cavities in the main mold, with which several plungers can engage and which can be fed under a series of air-pipes to blow the parisons to finished shape, and it is also apparent that the fourth or closed position can be dispensed with, if desired.

It will be apparent from the foregoing description that my improved apparatus is exceedingly simple and rapid in its operation and that an article such as a bottle can be made at one operation without manual handling of the same or requiring it to be shifted to other molds or devices for finishing it, and practical experience has proved that a bottle made with this machine is accurate and true as to finish. By the use of the rotatable plunger-head different-sized plungers can be used for different wares, and when one plunger becomes too hot a cold plunger can be substituted for it. The raising of the press-mold and the lowering of the plunger are accomplished simultaneously, thereby avoiding separate operations of the same and the harmful chilling of the glass. The openings in the rotary table $e$ are of elongated form, so that the table may be rotated immediately upon the withdrawal of the plunger out of the neck-mold and without waiting for the press-mold to attain its lowest position.

Various modifications in the construction, position, and design of the various parts may be resorted to without departing from the spirit of the invention or sacrificing any of its advantages.

I claim—

1. In apparatus for forming glass articles, the combination of a rotatory table, a press-mold fixedly situate beneath the table at the charging-point adapted to receive the molten glass through the table, a mold in which the neck is formed, and a plunger above the press-mold and in line therewith.

2. In apparatus for forming glass articles, the combination of a plunger, a rotatory table, a mold in which the neck is formed, a press-mold fixedly situate beneath the table, and mechanism for moving the plunger and press-mold simultaneously toward and away from each other.

3. In apparatus for forming glass articles, the combination of a rotatory table, a press-mold fixedly situate beneath the table at the charging-point adapted to receive the molten glass through the table, a mold in which the neck is formed, a plunger above the press-mold and in line therewith, and mechanism for moving the press-mold to and from the neck-mold.

4. In apparatus for forming glass articles, the combination of a rotatory table, a press-mold fixedly situate beneath the table at the charging-point adapted to receive the molten glass through the table, a mold in which the neck is formed, a plunger above the press-mold and in line therewith, mechanism for moving the press-mold to and from the neck-mold, and mechanism for automatically locking the press-mold in its raised position.

5. The combination of an endless carrier, a plurality of neck-molds carried thereby, a single press-mold fixedly situate beneath the carrier at the charging-point and adapted to receive the molten glass through the endless carrier, and mechanism for raising and lowering the press-mold to and from each of the neck-molds.

6. The combination of an endless carrier, a plurality of neck-molds carried thereby, a single press-mold fixedly situate beneath the carrier at the charging-point and adapted to receive the molten glass through the endless carrier, mechanism for raising and lowering the press-mold to and from each of the neck-molds, and mechanism for automatically locking the press-mold in its raised position.

7. The combination of an endless carrier, a plurality of neck-molds carried thereby, a single press-mold fixedly situate beneath the carrier at the charging-point and adapted to receive the molten glass through the endless carrier, a vertically-movable slide connected to the press-mold, and mechanism connected to said slide for raising and lowering the same.

8. The combination of an endless carrier, a plurality of neck-molds carried thereby, a single press-mold fixedly situate beneath the carrier at the charging-point and adapted to receive the molten glass through the endless carrier, a vertically-movable slide connected to the press-mold, mechanism connected to said slide for raising and lowering the same, and mechanism for automatically locking the slide in its raised position.

9. The combination of an endless carrier, a plurality of neck-molds carried thereby, a press-mold mounted on a vertically-movable slide for receiving the molten glass, a rod pivoted to said slide and connected to a shaft, and mechanism connected to said shaft for raising and lowering the press-mold to and from each one of the neck-molds, substantially as and for the purpose set forth.

10. The combination of an endless carrier, a plurality of neck-molds carried thereby, a press-mold mounted on a vertically-movable slide for receiving the molten glass, a rod pivoted to said slide, and mechanism connected to said rod for raising and lowering the press-mold to and from each one of the neck-molds, substantially as and for the purposes set forth.

11. The combination of an endless carrier, a plurality of neck-molds carried thereby, a press-mold mounted on a vertically-movable slide for receiving the molten glass, a rod pivoted to said slide and provided with a link thereon, and mechanism connected to said link for raising and lowering the press-mold to and from each one of the neck-molds, substantially as and for the purposes set forth.

12. The combination of an endless carrier, a plurality of neck-molds carried thereby, a press-mold mounted on a slide for receiving the molten glass, a rod pivoted to said slide and provided with a link thereon, a bell-crank lever mounted on a shaft having one arm journaled in said link, and mechanism connected to the opposite arm of the bell-crank lever for raising and lowering the press-mold to and from each one of the neck-molds, substantially as and for the purposes set forth.

13. The combination of an endless carrier, a plurality of neck-molds carried thereby, a press-mold mounted on a slide for receiving the molten glass, a rod pivoted to said slide and provided with a link thereon, a bell-crank lever mounted on a shaft having one arm journaled in said link, a rod connected to the opposite arm of said bell-crank lever, and mechanism connected to said last-named rod for raising and lowering the press-mold to and from each one of the neck-molds, substantially as and for the purposes set forth.

14. The combination of an endless carrier, a plurality of molds carried thereby, a press-mold for receiving the molten glass mounted upon a slide, a rod pivoted to the said slide and provided with a link thereon, and a bell-crank lever mounted on a shaft having one end journaled in said link, and a rod connected to the opposite end of the bell-crank lever and connected to a disk or arm on the main shaft to raise and lower the press-mold to and from each one of the molds, substantially as and for the purposes set forth.

15. The combination of an endless carrier, a plurality of molds carried thereby, a press-mold for receiving the molten glass mounted upon a slide, means for raising and lowering the press-mold to and from the plurality of molds, and a rocking or tilting mechanism adapted to engage with said slide to automatically lock the press-mold in its raised position, substantially as and for the purposes set forth.

16. The combination of an endless carrier, a plurality of molds carried thereby, a press-mold for receiving the molten glass mounted upon a slide, mechanism for raising and lowering the press-mold to and from the plurality of molds, a rocking or tilting mechanism adapted to engage with the slide to automatically lock the press-mold in its raised position, and means connected to the raising and lowering mechanism to operate the same, substantially as and for the purposes set forth.

17. The combination of an endless carrier, a plurality of molds carried thereby, a press-mold for receiving the molten glass mounted upon a slide, mechanism for raising and lowering the press-mold to and from the plurality of molds, a rocking or tilting mechanism adapted to engage with the slide to lock the press-mold in its raised position, and a rod connected to the raising and lowering mechanism having a nut thereon adapted to engage with the rocking or tilting mechanism to operate the same, substantially as and for the purposes set forth.

18. The combination of an endless carrier, a plurality of molds carried thereby, a press-mold for receiving the molten glass mounted upon a slide, mechanism for raising and lowering the press-mold to and from the plurality of molds, a rocking or tilting mechanism adapted to engage with the slide to lock the press-mold in its raised position, a rod connected to the raising and lowering mechanism having a nut thereon adapted to engage with the rocking or tilting mechanism, and a spring connected to the rocking or tilting mechanism and to the raising and lowering mechanism to operate the same, substantially as and for the purposes set forth.

19. The combination of a pressing-head, a rotatable disk mounted on said pressing-head, slides mounted within said disk, and a series of plungers connected to said slides.

20. The combination with the pressing-head having seats, of a rotatable disk mounted on said pressing-head, a series of plungers on said disk, an operating-handle having a rod thereon extending through the rotating disk and adapted to engage with the seats in the pressing-head, and a spring fitting around the rod within the rotating disk, substantially as and for the purposes set forth.

21. In blowing mechanism, the combination of a cylinder or support, a hollow blowing-tube extending through the cylinder or support, and a cam or eccentric engaging with the hollow blowing-tube to raise and lower the same, substantially as and for the purposes set forth.

22. In blowing mechanism, the combination of a cylinder or support, a hollow blowing-tube extending through the cylinder or support, a slot within said cylinder or support, and a cam or eccentric having a pin thereon extending through said slot and engaging with the hollow blowing-tube to raise and lower the same, substantially as and for the purposes set forth.

23. In blowing mechanism, the combination of a cylinder or support, a hollow blowing-tube extending through the cylinder or support, means engaging with the hollow tube for raising and lowering the same, and means for holding the hollow blowing-tube in its lowered position, substantially as and for the purposes set forth.

24. In blowing mechanism, the combination of a cylinder or support, a hollow tube extending through the cylinder or support, means engaging with the hollow tube for raising and lowering the same, and a spring connected to said hollow tube to hold it in its lowered position, substantially as and for the purposes set forth.

25. In blowing mechanism, the combination with a mold, of a cylinder or support, a hollow blowing-tube extending through the cylinder or support, a series of openings at the lower end of the hollow tube, and a rigid flange or collar on said blowing-tube for engaging with the top of the mold, substantially as and for the purposes set forth.

26. In blowing mechanism, the combination with a mold, of a cylinder or support, a hollow blowing-tube extending through the cylinder or support, a flange or collar on said blowing-tube for engaging with the top of the mold, and a tapered point below said rigid flange having a series of openings therein, substantially as and for the purposes set forth.

27. In blowing mechanism, the combination with a mold, of a cylinder or support, a hollow blowing-tube extending through the cylinder or support, a flange or collar on said blowing-tube for engaging with the top of the mold, a straight or flat face below said rigid flange or collar for entering said mold, and a tapered point below said straight or flat face having a series of openings therein, substantially as and for the purposes set forth.

28. In apparatus for forming articles of glassware, the combination with a press-mold, of a plunger, mechanism for raising the press-mold and for lowering the plunger simultaneously, mechanism for locking the press-mold in its raised position, and mechanism for continuing the downward movement of the plunger after the mold has been locked.

In testimony whereof I, the said JOHN J. POWER, have hereunto set my hand.

JOHN J. POWER.

Witnesses:
J. N. COOKE,
JOHN JACKSON.